US012764390B2

(12) United States Patent
Haberman

(10) Patent No.: US 12,764,390 B2
(45) **Date of Patent: *Oct. 13, 2026**

(54) SYSTEMS AND METHODS FOR GENERATING MEDIA CONTENT USING MICROTRENDS

(71) Applicant: FreeWheel Media, Inc., Philadelphia, PA (US)

(72) Inventor: Seth Haberman, New York, NY (US)

(73) Assignee: FreeWheel Media, Inc., Philadelphia, PA (US)

( * ) Notice: Subject to any disclaimer, the term of this patent is extended or adjusted under 35 U.S.C. 154(b) by 93 days.

This patent is subject to a terminal disclaimer.

(21) Appl. No.: 18/925,882

(22) Filed: Oct. 24, 2024

(65) Prior Publication Data

US 2025/0142179 A1 May 1, 2025

Related U.S. Application Data

(63) Continuation of application No. 17/823,770, filed on Aug. 31, 2022, now Pat. No. 12,155,909, which is a continuation of application No. 16/573,350, filed on Sep. 17, 2019, now Pat. No. 11,477,539, which is a continuation of application No. 15/166,502, filed on (Continued)

(51) Int. Cl.

| | |
|---|---|
| ***H04N 21/81*** | (2011.01) |
| ***G06Q 30/02*** | (2023.01) |
| ***H04N 7/173*** | (2011.01) |
| ***H04N 21/25*** | (2011.01) |
| ***H04N 21/262*** | (2011.01) |
| ***H04N 21/2668*** | (2011.01) |
| ***H04N 21/658*** | (2011.01) |

(52) U.S. Cl.

CPC .......... *H04N 21/812* (2013.01); *G06Q 30/02* (2013.01); *H04N 7/17318* (2013.01); *H04N 21/252* (2013.01); *H04N 21/262* (2013.01); *H04N 21/2668* (2013.01); *H04N 21/6582* (2013.01); *H04N 21/8126* (2013.01)

(58) Field of Classification Search

None

See application file for complete search history.

(56) References Cited

U.S. PATENT DOCUMENTS

| | | | |
|---|---|---|---|
| 3,366,731 | A | 1/1968 | Wallerstein |
| 3,639,686 | A | 2/1972 | Walker et al. |

(Continued)

FOREIGN PATENT DOCUMENTS

| | | |
|---|---|---|
| JP | 2001-508259 | 6/2001 |
| JP | 2002-094965 A | 3/2002 |

(Continued)

OTHER PUBLICATIONS

European Search Report from corresponding European Patent Application No. 07755925.0, dated Nov. 3, 2011.

(Continued)

*Primary Examiner* — James R Marandi

(74) *Attorney, Agent, or Firm* — BakerHostetler

(57) ABSTRACT

In accordance with the present invention, a media generation application that allows a user to create and customize a commercial based on microtrend information and/or feedback information is provided.

20 Claims, 7 Drawing Sheets

Related U.S. Application Data

May 27, 2016, now Pat. No. 10,462,532, which is a continuation of application No. 11/789,406, filed on Apr. 24, 2007, now Pat. No. 9,357,179.

(60) Provisional application No. 60/794,624, filed on Apr. 24, 2006.

(56) References Cited

U.S. PATENT DOCUMENTS 4,331,974 A 5/1982 Cogswell et al.
4,475,123 A 10/1984 Dumbauld et al.
4,573,072 A 2/1986 Freeman
4,602,279 A 7/1986 Freeman
4,625,235 A 11/1986 Watson
4,638,359 A 1/1987 Watson
4,703,423 A 10/1987 Bado et al.
4,716,410 A 12/1987 Nozaki
4,789,235 A 12/1988 Borah et al.
4,814,883 A 3/1989 Perine et al.
4,847,698 A 7/1989 Freeman
4,847,699 A 7/1989 Freeman
4,847,700 A 7/1989 Freeman
4,850,007 A 7/1989 Marino et al.
4,918,516 A 4/1990 Freeman
5,099,422 A 3/1992 Foresman et al.
5,105,184 A 4/1992 Pirani et al.
5,155,591 A 10/1992 Wachob
5,173,900 A 12/1992 Miller et al.
5,220,501 A 6/1993 Lawlor et al.
5,231,494 A 7/1993 Wachob
RE34,340 E 8/1993 Freeman
5,253,940 A 10/1993 Abecassis
5,260,778 A 11/1993 Kauffman et al.
5,291,395 A 3/1994 Abecassis
5,305,195 A 4/1994 Murphy
5,343,239 A 8/1994 Lappington et al.
5,347,632 A 9/1994 Filepp et al.
5,356,151 A 10/1994 Abecassis
5,361,393 A 11/1994 Rossillo
5,377,354 A 12/1994 Scannell et al.
5,414,455 A 5/1995 Hooper et al.
5,422,468 A 6/1995 Abecassis
5,424,770 A 6/1995 Schmelzer et al.
5,426,281 A 6/1995 Abecassis
5,434,678 A 7/1995 Abecassis
5,442,390 A 8/1995 Hooper et al.
5,442,771 A 8/1995 Filepp et al.
5,446,919 A 8/1995 Wilkins
5,448,568 A 9/1995 Delpuch et al.
5,499,046 A 3/1996 Schiller et al.
5,515,098 A 5/1996 Carles
5,515,270 A 5/1996 Weinblatt
5,519,433 A 5/1996 Lappington et al.
5,526,035 A 6/1996 Lappington et al.
5,537,141 A 7/1996 Harper et al.
5,548,532 A 8/1996 Menand et al.
5,550,735 A 8/1996 Slade et al.
5,566,353 A 10/1996 Cho et al.
5,584,025 A 12/1996 Keithley et al.
5,585,838 A 12/1996 Lawler et al.
5,585,858 A 12/1996 Harper et al.
5,594,910 A 1/1997 Filepp et al.
5,610,653 A 3/1997 Abecassis
5,617,142 A 4/1997 Hamilton
5,632,007 A 5/1997 Freeman
5,634,849 A 6/1997 Abecassis
5,636,346 A 6/1997 Saxe
5,638,113 A 6/1997 Lappington et al.
5,652,615 A 7/1997 Bryant et al.
5,671,225 A 9/1997 Hooper et al.
5,682,196 A 10/1997 Freeman
5,684,918 A 11/1997 Abecassis
5,696,869 A 12/1997 Abecassis
5,717,814 A 2/1998 Abecassis
5,717,923 A 2/1998 Dedrick
5,724,091 A 3/1998 Freeman et al.
5,724,472 A 3/1998 Abecassis
5,724,521 A 3/1998 Dedrick
5,734,413 A 3/1998 Lappington et al.
5,740,388 A 4/1998 Hunt
5,740,549 A 4/1998 Reilly et al.
5,754,939 A 5/1998 Herz et al.
5,758,259 A 5/1998 Lawler
5,761,601 A 6/1998 Nemirofsky et al.
5,764,275 A 6/1998 Lappington et al.
5,768,521 A 6/1998 Dedrick
5,774,170 A 6/1998 Hite et al.
5,774,664 A 6/1998 Hidary et al.
5,778,181 A 7/1998 Hidary et al.
5,784,095 A 7/1998 Robbins et al.
5,784,528 A 7/1998 Yamane et al.
5,796,945 A 8/1998 Tarabella
5,802,314 A 9/1998 Tullis et al.
5,805,974 A 9/1998 Hite et al.
5,825,884 A 10/1998 Zdepski et al.
5,835,087 A 11/1998 Herz et al.
5,859,660 A 1/1999 Perkins et al.
5,861,881 A 1/1999 Freeman et al.
5,867,208 A 2/1999 Mclaren
5,873,068 A 2/1999 Beaumont et al.
5,884,305 A 3/1999 Kleinberg et al.
5,887,243 A 3/1999 Harvey et al.
5,903,263 A 5/1999 Emura
5,907,837 A 5/1999 Ferrel et al.
5,913,031 A 6/1999 Blanchard
5,917,830 A 6/1999 Chen et al.
5,926,205 A 7/1999 Krause et al.
5,929,850 A 7/1999 Broadwin et al.
5,930,446 A 7/1999 Kanda
5,931,901 A 8/1999 Wolfe et al.
5,937,331 A 8/1999 Kalluri et al.
5,978,799 A 11/1999 Hirsch
5,986,692 A 11/1999 Logan et al.
5,991,735 A 11/1999 Gerace
6,002,393 A 12/1999 Hite et al.
6,018,768 A 1/2000 Ullman et al.
6,026,368 A 2/2000 Brown et al.
6,029,045 A 2/2000 Picco et al.
6,038,000 A 3/2000 Hurst, Jr.
6,038,367 A 3/2000 Abecassis
6,049,569 A 4/2000 Radha et al.
6,067,348 A 5/2000 Hibbeler
6,075,551 A 6/2000 Berezowski et al.
6,084,581 A 7/2000 Hunt
6,108,486 A 8/2000 Sawabe et al.
6,119,098 A 9/2000 Guyot et al.
6,134,380 A 10/2000 Kushizaki
6,137,834 A 10/2000 Wine et al.
6,141,358 A 10/2000 Hurst et al.
6,160,570 A 12/2000 Sitnik
6,204,840 B1 3/2001 Petelycky et al.
6,304,852 B1 10/2001 Loncteaux
6,310,915 B1 10/2001 Wells et al.
6,327,574 B1 12/2001 Kramer et al.
6,330,286 B1 12/2001 Lyons et al.
6,343,287 B1 1/2002 Kumar et al.
6,345,122 B1 2/2002 Yamato et al.
6,357,042 B2 3/2002 Srinivasan et al.
6,360,234 B2 3/2002 Jain et al.
6,360,368 B1 3/2002 Chawla
6,408,278 B1 6/2002 Carney et al.
6,411,992 B1 6/2002 Srinivasan et al.
6,424,991 B1 7/2002 Gish
6,441,832 B1 8/2002 Tao et al.
6,449,657 B2 9/2002 Stanbach et al.
6,452,612 B1 9/2002 Holtz et al.
6,457,010 B1 9/2002 Eldering et al.
6,463,444 B1 10/2002 Jain et al.
6,463,585 B1 10/2002 Hendricks et al.
6,466,975 B1 10/2002 Sterling
6,502,076 B1 12/2002 Smith
6,529,550 B2 3/2003 Tahara et al.
6,567,980 B1 5/2003 Jain et al.

(56) References Cited

U.S. PATENT DOCUMENTS

| | | | | |
|---|---|---|---|---|
| 6,574,793 | B1 | 6/2003 | Ngo et al. | |
| 6,588,013 | B1 | 7/2003 | Lumley et al. | |
| 6,601,237 | B1 | 7/2003 | Ten et al. | |
| 6,611,624 | B1 | 8/2003 | Zhang et al. | |
| 6,671,880 | B2 | 12/2003 | Shah-Nazaroff et al. | |
| 6,678,332 | B1 | 1/2004 | Gardere et al. | |
| 6,681,395 | B1 | 1/2004 | Nishi | |
| 6,694,482 | B1 | 2/2004 | Arellano et al. | |
| 6,698,020 | B1 | 2/2004 | Zigmond et al. | |
| 6,735,628 | B2 | 5/2004 | Eyal | |
| 6,785,289 | B1 | 8/2004 | Ward et al. | |
| 6,806,909 | B1 | 10/2004 | Radha et al. | |
| 6,820,277 | B1 | 11/2004 | Eldering et al. | |
| 6,850,252 | B1 | 2/2005 | Hoffberg | |
| 6,857,024 | B1 | 2/2005 | Chen et al. | |
| 6,877,134 | B1 | 4/2005 | Fuller et al. | |
| 6,925,610 | B2 | 8/2005 | Thurston et al. | |
| 7,079,176 | B1 | 7/2006 | Freeman et al. | |
| 7,904,922 | B1 | 3/2011 | Haberman et al. | |
| 8,230,461 | B1 | 7/2012 | Ledermann et al. | |
| 9,357,179 | B2 | 5/2016 | Haberman | |
| 10,462,532 | B2 | 10/2019 | Haberman | |
| 11,477,539 | B2 | 10/2022 | Haberman | |
| 2001/0013123 | A1 | 8/2001 | Freeman et al. | |
| 2001/0013124 | A1 | 8/2001 | Klosterman et al. | |
| 2002/0023010 | A1 | 2/2002 | Rittmaster et al. | |
| 2002/0023165 | A1 | 2/2002 | Lahr | |
| 2002/0024532 | A1 | 2/2002 | Fables et al. | |
| 2002/0026359 | A1 | 2/2002 | Long et al. | |
| 2002/0056093 | A1 | 5/2002 | Kunkel et al. | |
| 2002/0057336 | A1 | 5/2002 | Gaul et al. | |
| 2002/0083443 | A1 | 6/2002 | Eldering et al. | |
| 2002/0092017 | A1 | 7/2002 | Klosterman et al. | |
| 2002/0095676 | A1 | 7/2002 | Knee et al. | |
| 2002/0129362 | A1* | 9/2002 | Chang | H04N 7/17318 348/E7.071 |
| 2002/0144283 | A1 | 10/2002 | Headings et al. | |
| 2002/0147570 | A1 | 10/2002 | Kraft et al. | |
| 2003/0004810 | A1 | 1/2003 | Eldering | |
| 2003/0005432 | A1 | 1/2003 | Ellis et al. | |
| 2003/0110500 | A1 | 6/2003 | Rodriguez | |
| 2003/0121058 | A1 | 6/2003 | Dimitrova et al. | |
| 2003/0163359 | A1 | 8/2003 | Kanesaka | |
| 2003/0171990 | A1 | 9/2003 | Rao et al. | |
| 2003/0177503 | A1 | 9/2003 | Sull et al. | |
| 2004/0025180 | A1 | 2/2004 | Begeja et al. | |
| 2004/0111742 | A1 | 6/2004 | Hendricks et al. | |
| 2004/0136698 | A1 | 7/2004 | Mock | |
| 2004/0163101 | A1 | 8/2004 | Swix et al. | |
| 2004/0194131 | A1 | 9/2004 | Ellis et al. | |
| 2004/0249650 | A1* | 12/2004 | Freedman | G06Q 30/0201 705/7.29 |
| 2005/0028193 | A1 | 2/2005 | Candelore et al. | |
| 2005/0086691 | A1 | 4/2005 | Dudkiewicz et al. | |
| 2005/0086692 | A1 | 4/2005 | Dudkiewicz et al. | |
| 2005/0166224 | A1 | 7/2005 | Ficco | |
| 2006/0253323 | A1 | 11/2006 | Phan et al. | |
| 2010/0169910 | A1 | 7/2010 | Collins et al. | |

FOREIGN PATENT DOCUMENTS

| | | | |
|---|---|---|---|
| JP | 2002-262223 | A | 9/2002 |
| JP | 2002-304572 | A | 10/2002 |
| JP | 2003-189285 | A | 7/2003 |
| JP | 2003-522437 | | 7/2003 |
| JP | 2003-244677 | A | 8/2003 |
| JP | 2003-529127 | | 9/2003 |
| JP | 2003-331183 | A | 11/2003 |
| JP | 2004-515174 | | 5/2004 |
| JP | 2004-336442 | A | 11/2004 |
| JP | 2007-516664 | | 6/2007 |
| WO | 98/31114 | A1 | 7/1998 |
| WO | 01/20481 | A2 | 3/2001 |
| WO | 01/77776 | A2 | 10/2001 |
| WO | 01/77939 | A1 | 10/2001 |
| WO | 02/45433 | A2 | 6/2002 |
| WO | 2002/102030 | A2 | 12/2002 |
| WO | 2005/053301 | A2 | 6/2005 |

OTHER PUBLICATIONS

International Search Report for PCT International Patent Application No. PCT/US2006/022308.

Japanese Office Action (translation) from corresponding Japanese Patent Application No. 2013-172133, dated Mar. 30, 2015.

Japanese Office Action (translation), Japanese Patent Application No. 2009-507746, (pp. 1-3).

Linnett; Advertising Age, Nov. 17, 2003: "The Biz: Intellispot makes smart commercials", 2 pages.

P. Johnson et al., "Strategic Online Advertising: Modeling Internet User Behavior with Advertising.Com", Aril 14, 2006, University of Virginia.

Ryan Singel, "Map Hacks on Crack", Wired, Jul. 2, 2005.

Template Creation and Editing for a Message Campaign, filed Apr. 7, 2000, U.S. Appl. No. 09/545,524.

US Patent Application filed on Aug. 31, 2022, entitled "Systems and Methods for Generating Media Content Using Microtrends", U.S. Appl. No. 17/823,770.

US Patent Application filed on Sep. 17, 2019, entitled "Systems and Methods for Generating Media Content Using Microtrends", U.S. Appl. No. 16/573,350.

* cited by examiner

400

500

600

700

SYSTEMS AND METHODS FOR GENERATING MEDIA CONTENT USING MICROTRENDS

CROSS-REFERENCE TO RELATED APPLICATIONS

This application is a continuation of U.S. patent application Ser. No. 17/823,770 filed Aug. 31, 2022, now U.S. Pat. No. 12,155,909, issued on Nov. 26, 2024, which is a continuation of U.S. patent application Ser. No. 16/573,350 filed Sep. 17, 2019, which issued as U.S. Pat. No. 11,477,539 on Oct. 18, 2022, which is a continuation of U.S. patent application Ser. No. 15/166,502 filed May 27, 2016, which issued as U.S. Pat. No. 10,462,532 on Oct. 29, 2019, which is a continuation of U.S. patent application Ser. No. 11/789,406 filed Apr. 24, 2007, which issued as U.S. Pat. No. 9,357,179 on May 31, 2016, which claims the benefit of U.S. Provisional Patent Application No. 60/794,624, filed on Apr. 24, 2006, each of which is hereby incorporated by reference in its entirety.

FIELD OF THE INVENTION

The present invention relates to the field of generating and customizing media content. More particularly, the present invention provides systems and method for generating and customizing commercials using microtrend information and/or feedback information.

BACKGROUND OF THE INVENTION

Media content, such as advertisements, commercials, and television programs, is created with the goal of having the content viewed, listened to, or otherwise received by a target audience. The target audience could be, for example, the entire world, a single nation, a region, a city, a neighborhood, or a specific individual. However, distributing the desired content and targeting it to the desired audience is a difficult process. It is often difficult to control which consumers receive a specific piece of media content. As a result, a distributor or creator of content generally provides that content to a larger or smaller area than desired.

For example, marketers and advertisers have come to rely on demographic solutions to establish patterns and trends about the purchasing habits of their target audience. Marketers and advertisers use the derived information to generate observations relating to their markets, target individuals to different types of offerings, and select appropriate media purchases for advertising. In the case of video advertising media—e.g., video tapes that are mailed, Internet video streams, or broadcast or cable advertising, there are only limited means to produce personalized versions of the advertisements or direct marketing information that directly takes advantage of information available about the target audience. As such, even though companies know a tremendous amount of information about their target audience, the ability to leverage this information has been limited by the fundamentals of the broadcast medium, thus requiring that a like message be sent to all customers.

In another example, a marketer and/or advertiser may create a general advertising campaign. When a parent company purchases the general campaign from the marketer and/or advertiser, the company generally provides the campaign to their field offices (e.g., a subsidiary organization) for distribution. Each field office typically hires another advertising agency to modify the advertisement based on, for example, the respective market. This process of modifying the advertisement is not only expensive, but the message that the modified advertisement contains may veer from the general campaign that the parent organization desired. In addition, the changes that are made might be made separately, and thus redundantly by the different field offices. This is an expensive and ineffective method of creating and distributing content.

Accordingly, there exists a need for systems and methods for content management that overcome these and other deficiencies in prior art systems.

SUMMARY OF THE INVENTION

In accordance with the present invention, systems and methods for generating and customizing commercials are provided. In particular, systems and methods that allow users to generate and customize commercials using microtrend information and/or feedback information are provided.

In some embodiments, the present invention allows a user to transmit to the media generation application a commercial template and a plurality of media segments for insertion into the commercial template. The commercial template includes a plurality of media slots that accommodate one or more of the plurality of media segments.

The media generation application receives, from an information source (e.g., a website, a linked website, a third party website, a cellular provider, etc.), information relating to user interactions with the information source, information relating to activity on the information source, and/or trend information relating to the information source. In some embodiments, the media generation application may query the information source for such information. Alternatively, the media generation application may analyze the information from the information source and other information sources to determine trend information.

In response to receiving microtrend information, the media generation application selects one or more media segments based on the received information. The media content management application may instruct an editing/assembly mechanism to assemble a completed commercial (e.g., a thirty-second spot), where the selected media segments are inserted into the media slots of the commercial template. The assembled commercial is presented to an audience.

In some embodiments, the media generation application receives feedback relating to the completed commercial from the information source. In response to receiving the feedback, the media content management application may update the assembled commercial by inserting different media segments into the commercial template.

In some embodiments, the media generation application creates construction rules based on the received feedback.

In some embodiments, the media generation application receives microtrend information from a plurality of information sources. In response, the media generation application analyzes the microtrend information and generates or updates a commercial based on the analysis.

Thus, there has been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and description matter in which there is illustrated preferred embodiments of the invention.

BRIEF DESCRIPTION OF THE DRAWINGS

Various objects, features, and advantages of the present invention can be more fully appreciated with reference to the following detailed description of the invention when considered in connection with the following drawing, in which like reference numerals identify like elements.

DETAILED DESCRIPTION OF THE INVENTION

Figure 1:
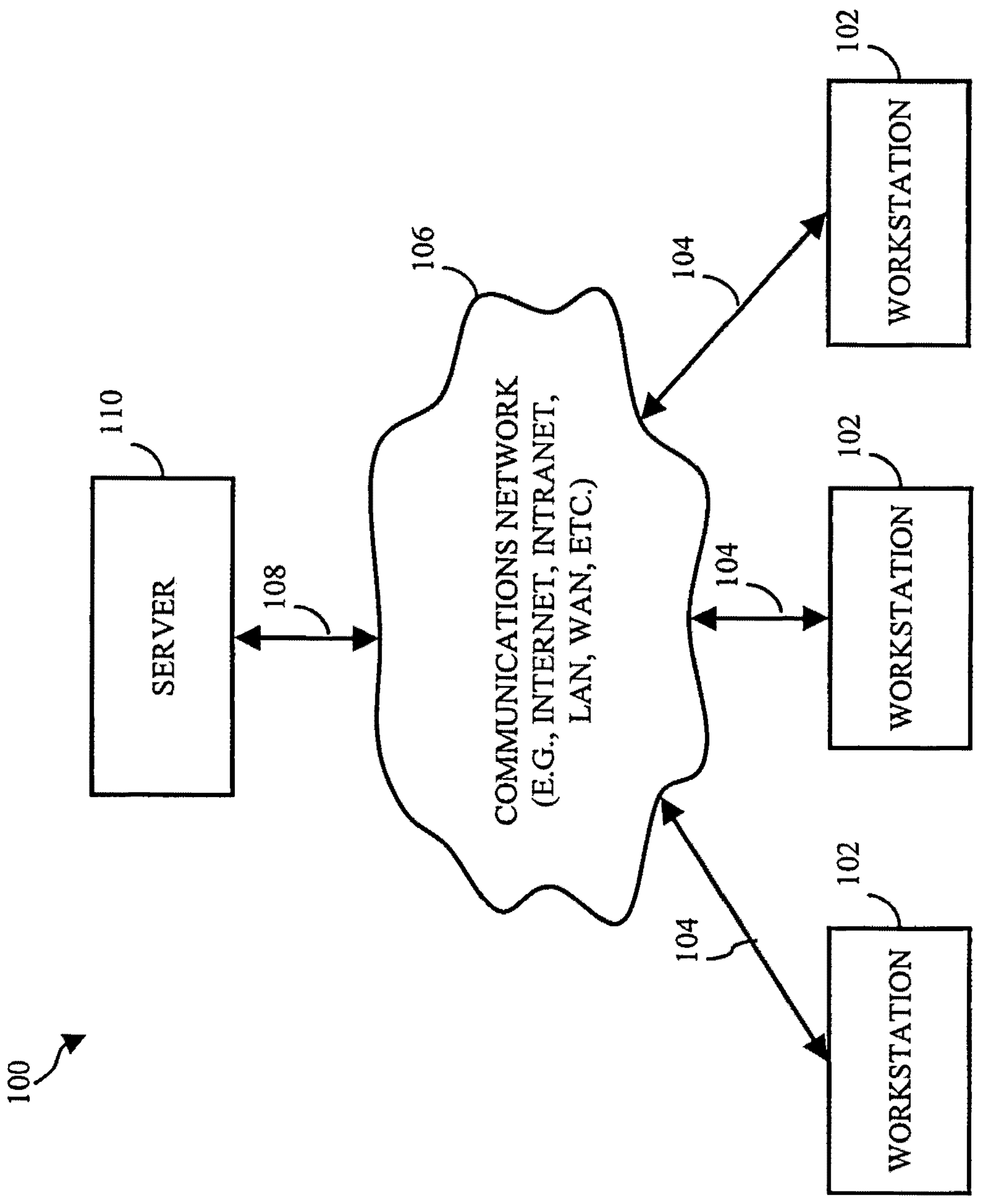
FIG. 1 is a schematic diagram of an illustrative media generation system on which a media generation application may be implemented in accordance with some embodiments of the present invention.

The following description includes many specific details. The inclusion of such details is for the purpose of illustration only and should not be understood to limit the invention. Moreover, certain features which are well known in the art are not described in detail in order to avoid complication of the subject matter of the present invention. In addition, it will be understood that features in one embodiment may be combined with features in other embodiments of the invention.

In accordance with the present invention, systems and methods for generating and customizing commercials (hereinafter "the media generation application" or "the application") are provided. In particular, systems and methods that customize and generate commercials and other media content using microtrend information and feedback information from information sources are provided. Users of the media generation application may include, for example, advertisers, marketers, users at a corporate headquarters, users at a field office, users at a subsidiary of a parent company, a cable operator, a service provider, a content provider, a multiple cable system operator (MSO), etc.

As used herein, microtrend information may include user interaction information or activity information on a particular website (e.g., Dell.com, NYTimes.com, Google.com, etc.), activity information on cellular telephones (e.g., the number of users downloading a particular application, location information), or any other suitable feedback from an information source. An information source may include, for example, a website, a cellular provider, a set-top box, etc.

In accordance with the present invention, the media generation application may query an information source for microtrend information. In response to receiving a response to the query from the information source, the application may use the received microtrend information to generate a customized commercial and/or update a previously created commercial with different media segments.

It should be noted that media segments may include, for example, portions of audio, portions of video, background audio, voiceovers, images, animations, graphics, etc.). The media segments are inserted into the media slots of a commercial template. These media segments may be received from the user, such as an advertiser. For example, an advertiser that has been hired to create a commercial may generate multiple media segments and upload the media segments to a special purpose database that is in communications with the media generation application (e.g., an object oriented database that stores a plurality of media segments). In another example, an information source, such as a website, may upload media segments relating to the information source (e.g., media segments relating to products sold on the website, new product descriptions, new product graphics, inventory information, etc.).

The media generation application uses the received microtrend information to select the appropriate media segments to generate a customized commercial and/or update a previously created commercial.

In some embodiments, the media generation application may receive feedback from the information source. The feedback may include, for example, feedback that the information has received from an audience member, information on the responsiveness or effectiveness of a commercial or media content, status updates from the information source (e.g., prevent commercials that are currently broadcast that relate to a particular deal on Dell printers because Dell is running out of printers, prevent commercials for a particular politician relating to a particular topic upon receiving feedback on that topic, etc.). In response to receiving the feedback, the media generation application may associate the feedback with the commercial campaign and store the feedback in the database. In some embodiments, the media generation application may develop or update construction rules based on the received feedback. For example, in response to receiving information that Ford is running low on a particular car model, the media generation application may develop construction rules that push commercials and other media content on other cars. In another example, in response to receiving information that Ford is running low on a particular car model, the media generation application may develop construction rules that add a media segment to the currently broadcast commercial that informs the viewers when the particular car model is back in stock.

It should be noted that although the following embodiments of the invention are described as relating to the generation and customization of commercials, these embodiments are not limited only to commercials. Rather, the invention may also be applied to any suitable media content, such as advertisements, television programs, videos, etc.

In some embodiments, the media generation application may work in conjunction with a third-party website, where the application receives microtrend and feedback information from the third-party website or the associated web server. For example, an advertiser using the application may have an established relationship with NYTimes.com (a third-party website) such that the application automatically receives microtrend information from NYTimes.com (e.g., top articles e-mailed to others, top articles viewed by visitors to NYTimes.com, most popular advertisements on NYTimes.com, etc.). In response to receiving the microtrend information from NYTimes.com, the application may generate commercials for a client (e.g., for a particular politician, for an electronic commerce website, etc.), where media segments are selected based on the microtrend information.

The following figures and appendices and their accompanying descriptions provide detailed examples of the implementation of the systems and methods of the present invention.

FIG. 1 is a generalized schematic diagram of an illustrative media generation system 100 on which a media generation application may be implemented in accordance with some embodiments of the present invention. As illustrated, system 100 may include one or more workstations 102. Workstations 102 may be local to each other or remote from each other. Workstations 102 are connected by one or more communications links 104 to a communications network 106 that is linked via a communications link 108 to a server 110.

System 100 may include one or more servers 110. Server 110 may be any suitable server for providing access to the media generation application, such as a processor, a computer, a data processing device, or a combination of such devices. Communications network 106 may be any suitable computer network including the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), or any combination of any of such networks. Communications links 104 and 108 may be any communications links suitable for communicating data between workstations 102 and server 110, such as network links, dial-up links, wireless links, hard-wired links, any other suitable communications links, or a combination of such links. Workstations 102 enable a user to access features of the media generation application. Workstations 102 may be personal computers, laptop computers, mainframe computers, dumb terminals, data displays, Internet browsers, personal digital assistants ("PDAs"), two-way pagers, wireless terminals, portable telephones, any other suitable access device, or any combination of such devices. Workstations 102 and server 110 may be located at any suitable location. In one embodiment, workstations 102 and server 110 may be located within an organization. Alternatively, workstations 102 and server 110 may be distributed between multiple organizations.

In some embodiments, server 110 may be in communications with a database. For example, server 110 may communicate with an object-oriented database that stores media segments, assembled commercials, feedback information, microtrend information, etc. The database may be untethered to the media generation application, a cable operator, a headend, a network provider, and/or any other suitable entity. The media generation application may access the database to retrieve media segments for assembling a commercial.

It should be noted that these media segments may be stored on high capacity, high speed servers, databases, or any suitable storage device capable of delivering these media segments in "real time" or "near real time" for production and assembly on the fly.

Figure 2:
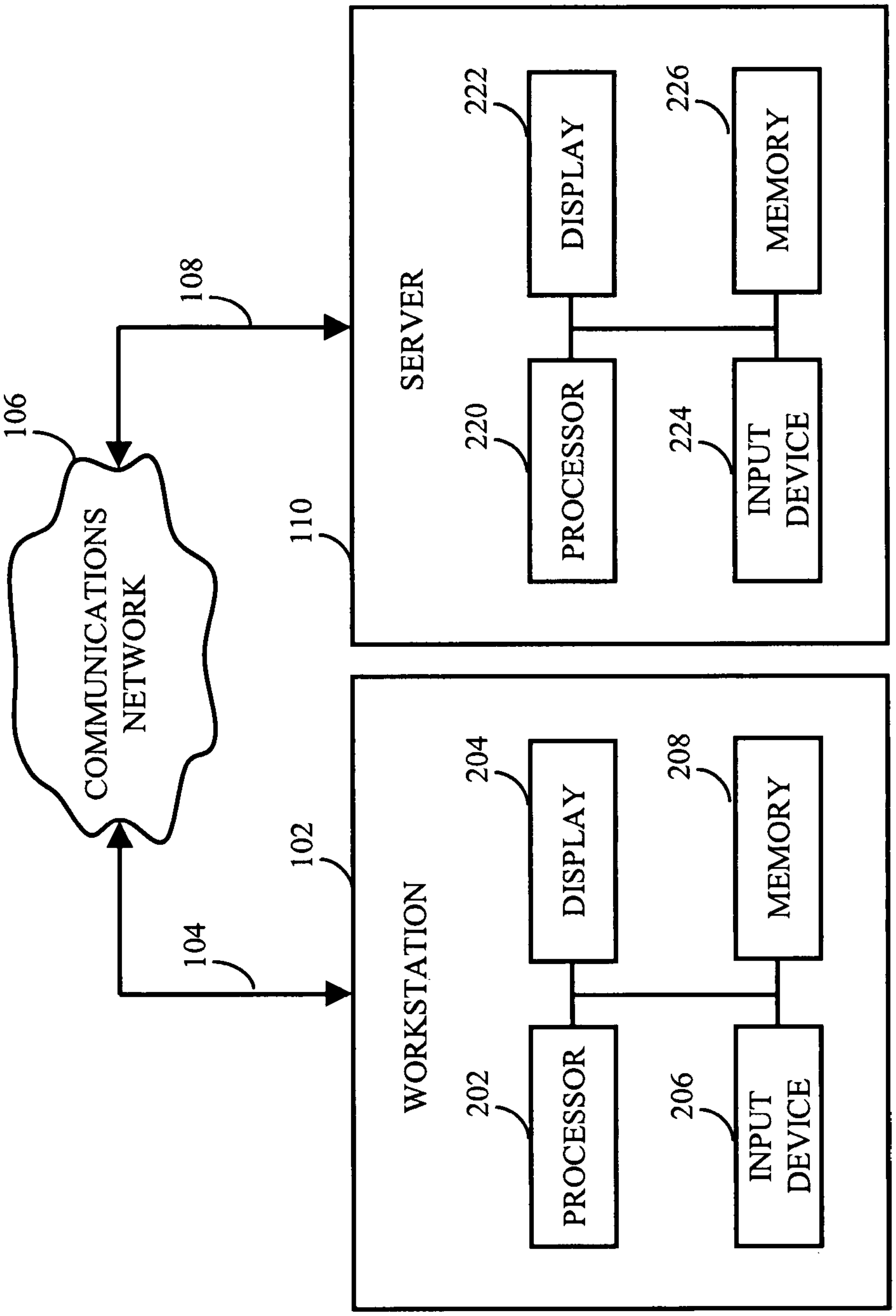
FIG. 2 is a schematic diagram of an illustrative workstation and server as provided, for example, in FIG. 1 in accordance with some embodiments of the present invention.

The server and one of the workstations, which are depicted in FIG. 1, are illustrated in more detail in FIG. 2. Referring to FIG. 2, workstation 102 may include processor 202, display 204, input device 206, and memory 208, which may be interconnected. In a preferred embodiment, memory 208 contains a storage device for storing a workstation program for controlling processor 202.

Processor 202 uses the workstation program to present on display 204 the application and the data received through communications link 104 and commands and values transmitted by a user of workstation 102. It should also be noted that data received through communications link 104 or any other communications links may be received from any suitable source, such as WebServices. Input device 206 may be a computer keyboard, a cursor-controller, dial, switchbank, lever, or any other suitable input device as would be used by a designer of input systems or process control systems.

Server 110 may include processor 220, display 222, input device 224, and memory 226, which may be interconnected. In a preferred embodiment, memory 226 contains a storage device for storing data received through communications link 108 or through other links, and also receives commands and values transmitted by one or more users. The storage device further contains a server program for controlling processor 220.

In some embodiments, the media generation application may include an application program interface (not shown), or alternatively, the application may be resident in the memory of workstation 102 or server 110. In another suitable embodiment, the only distribution to workstation 102 may be a graphical user interface ("GUI") which allows a user to interact with the media generation application resident at, for example, server 110.

In one particular embodiment, the media generation application may include client-side software, hardware, or both. For example, the application may encompass one or more Web-pages or Web-page portions (e.g., via any suitable encoding, such as HyperText Markup Language ("HTML"), Dynamic HyperText Markup Language ("DHTML"), Extensible Markup Language ("XML"), JavaServer Pages ("JSP"), Active Server Pages ("ASP"), Cold Fusion, or any other suitable approaches).

Although the media generation application is described herein as being implemented on a workstation and/or server, this is only illustrative. The application may be implemented on any suitable platform (e.g., a personal computer ("PC"), a mainframe computer, a dumb terminal, a data display, a two-way pager, a wireless terminal, a portable telephone, a portable computer, a palmtop computer, an H/PC, an automobile PC, a laptop computer, a personal digital assistant ("PDA"), a combined cellular phone and PDA, etc.) to provide such features.

It will also be understood that the detailed description herein may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

The system according to the invention may include a general purpose computer, or a specially programmed special purpose computer. The user may interact with the system via e.g., a personal computer or over PDA, e.g., the Internet, an Intranet, etc. Either of these may be implemented as a distributed computer system rather than a single computer. Similarly, the communications link may be a dedicated link, a modem over a POTS line, the Internet and/or any other method of communicating between computers and/or users. Moreover, the processing could be controlled by a software program on one or more computer systems or processors, or could even be partially or wholly implemented in hardware.

Although a single computer may be used, the system according to one or more embodiments of the invention is optionally suitably equipped with a multitude or combination of processors or storage devices. For example, the computer may be replaced by, or combined with, any suitable processing system operative in accordance with the concepts of embodiments of the present invention, including sophisticated calculators, hand held, laptop/notebook, mini, mainframe and super computers, as well as processing system network combinations of the same. Further, portions of the system may be provided in any appropriate electronic format, including, for example, provided over a communication line as electronic signals, provided on CD and/or DVD, provided on optical disk memory, etc.

Any presently available or future developed computer software language and/or hardware components can be employed in such embodiments of the present invention. For example, at least some of the functionality mentioned above could be implemented using Visual Basic, C, C++ or any assembly language appropriate in view of the processor being used. It could also be written in an object oriented and/or interpretive environment such as Java and transported to multiple destinations to various users.

Figure 3:
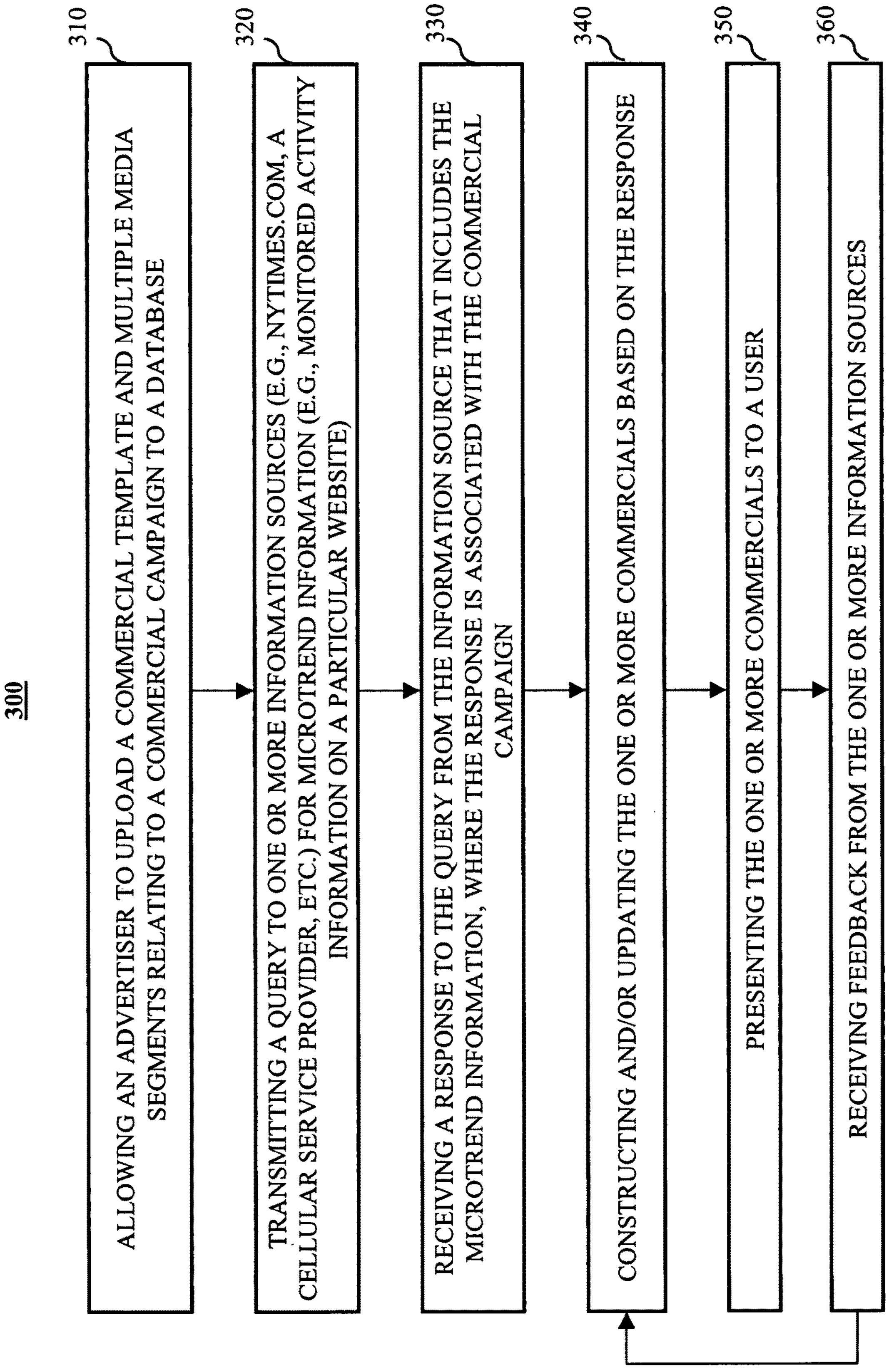
FIG. 3 is a simplified flowchart illustrating the steps performed in providing a media generation application that generates and/or updates commercials based on microtrend and/or feedback information in accordance with some embodiments of the present invention.

Turning to FIG. 3, a simplified flowchart illustrating the steps performed in receiving microtrend information and generating commercials in accordance with some embodiments of the present invention is provided. This is a generalized flow chart. It will be understood that the steps shown in FIG. 3 may be performed in any suitable order, some steps may be deleted, and others added.

As shown in FIG. 3, the process begins with allowing an advertiser to upload a commercial template, multiple media segments, and any other information relating to a particular commercial campaign at step 310. The commercial template, multiple media segments, and additional information may be stored in a database, such as the above-mentioned object-oriented database. The database may be organized by each commercial campaign. The database may also associate metadata tags with each piece of received data and organize the database using the metadata tags.

For example, an advertiser may be hired to create and produce one or more commercials for a particular politician. The advertiser may create a number of media segments (e.g., video clips, audio clips, graphics, background music, etc.) that relate to the particular politician, such as media segments on particular topics for the politician, a theme song for the politician, multiple images of the politician, etc. The advertiser may, using the media generation application, upload the media segments and additional information to the database. These media segments may be inserted into media slots in a commercial template.

It should be noted that media segments may have metadata associated with them in terms of relative or absolute fit with one or more semantic criteria. For example, in response to a price change, the media generation application (or an editing/assembly software package that is accessed by the application) may retrieve one or more different pieces of corresponding video segments and one or more different pieces of corresponding audio segments with rules on placement, synchronization of audio with video, and a change in the background music track. In another example, each media segment may have one or more metadata tags associated with it and the editing/assembly software package may retrieve media segments having the corresponding metadata characteristics. The metadata may affect how media content is sequenced, the primary audio segments and how it is married to the video segments, the background audio track and how it is married to the video segments, etc.

Figure 4:
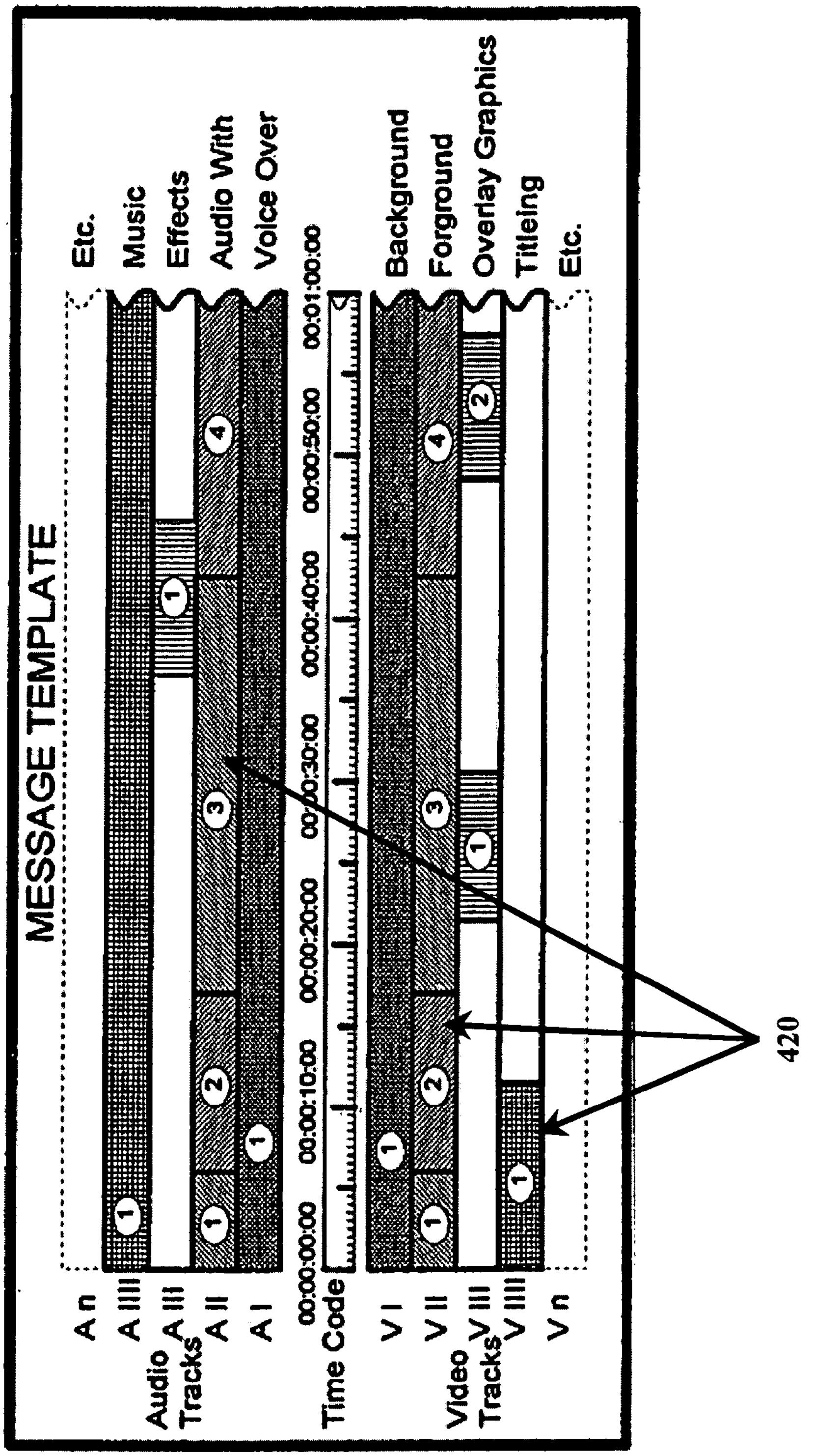
FIG. 4 is an illustrative message template that may be provided in accordance with some embodiments of the present invention.
Figure 5:
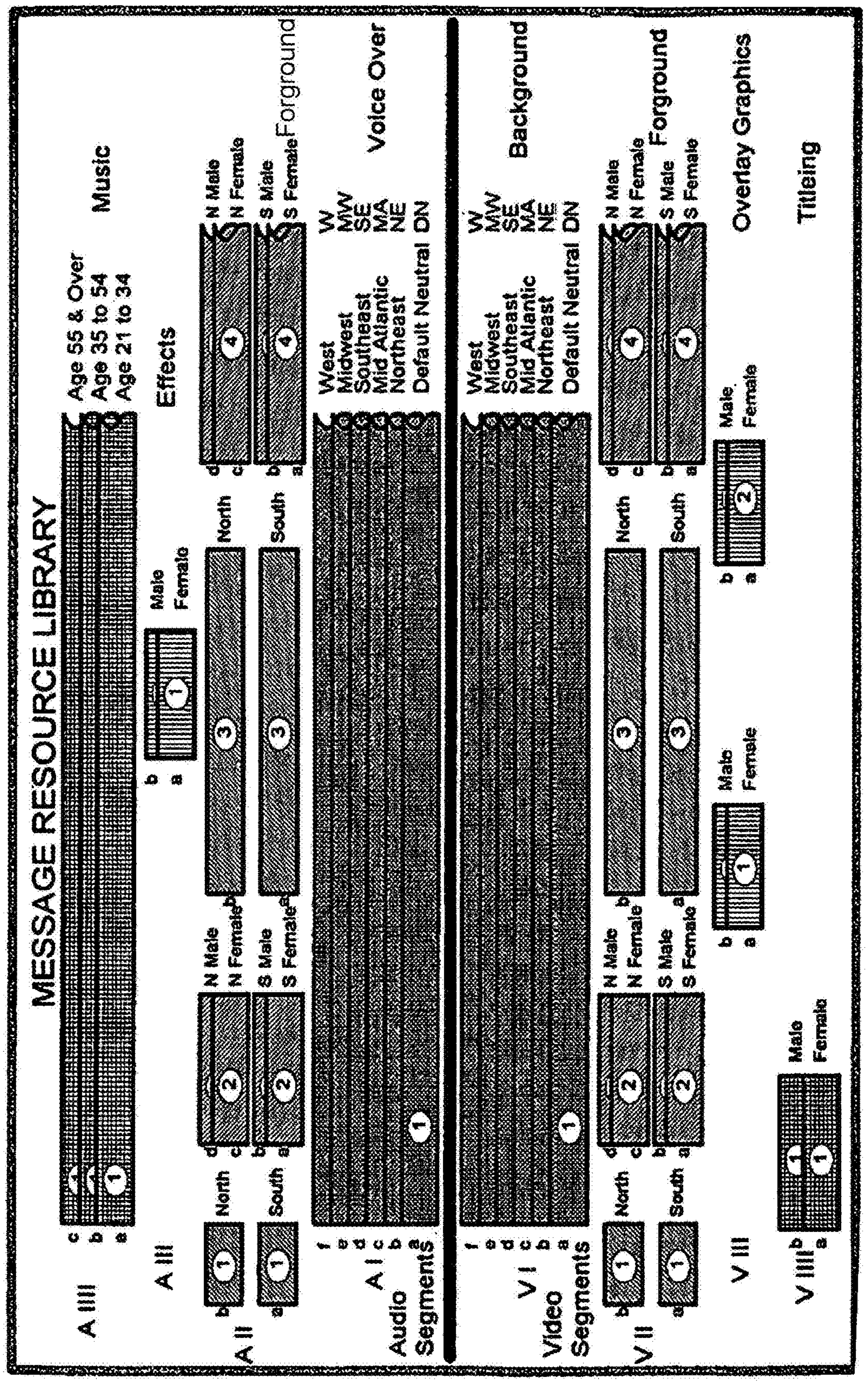
FIG. 5 is an illustrative schematic of the contents of a media database that may be provided in accordance with some embodiments of the present invention. in accordance with some embodiments of the present invention.

FIGS. 4 and 5 show an illustrative message template 400 and the contents 500 of a database that may be provided in accordance with some embodiments of the present invention. The message template 400 describes a framework to create and assemble media content for the target audience. The message template may include sequences 420, such as insertable sequences (e.g., insertable audio and/or video media segments) and/or predefined sequences. For example, predefined sequences may be inserted into the message template 400 that do not vary between different versions of the media content. In addition, the message template 400 may include rules for selection and combination of media segments and other resources to generate the media content.

It should be noted that the message template of the present invention 400 is not limited to orthogonal assembling of media segments. One or more elements of the media content are capable of being controlled and combined using various approaches to provide customized media content. For example, a background scene, such as a geographic landscape, is selected from one database and used as a common background throughout the playback of the media content, while insertable video segments are added to the media content at certain positions.

The design of the message template may be determined using information from the campaign, information from the default message (e.g., non-customized media content), etc.

Additional features for creating personalized messages based on user information are described in, for example, commonly-owned, commonly-assigned U.S. patent application Ser. No. 09/545,524, filed Apr. 7, 2000, which is hereby incorporated by reference herein in its entirety.

Referring back to FIG. 3, the application may transmit a query to one or more information sources for microtrend information at step 320. Microtrend information may include, for example, user interaction information or activity information on a particular website (e.g., Dell.com, NYTimes.com, Google.com, etc.), activity information on cellular telephones (e.g., the number of users downloading a particular application, location information), or any other suitable feedback from an information source. An information source may include, for example, a website, a cellular provider, a set-top box, etc.

For example, the application may transmit a query to the Dell.com website for updated product information that includes new product information, new product graphics, new product videos, etc. In another example, the application may transmit a query to the Dell.com website for inventory information on Dell.com products. In yet another example, the application may transmit a query to the Dell.com website to determine the most popular Dell.com products.

In another suitable example, an advertiser is using the media generation application to generate a commercial for a particular politician. However, the advertiser may be unaware of the particular concerns in a particular demographic or a particular area. To generate the commercial, the advertiser may direct the media generation application to query websites and other information sources that have an established relationship with the politician—e.g., NYTimes.com, the politician's personal website, a local party website, a news television station website, etc. The query to NYTimes.com may include, for example, a request for information on the articles most frequently e-mailed by NYTimes.com readers, NYTimes.com articles most frequently linked to by bloggers on the Web, keywords most frequently searched by NYTimes.com readers, the most popular movies among NYTimes.com readers. The query to a news television station website may include, for example, a request for the results on the latest survey posted on the website relating to political issues.

The information source may also be, for example, a cellular provider. For example, the application may transmit a query to the cellular provider to determine the most popular applications downloaded from the cellular provider. In another example, the application may transmit a query to the cellular provider to receive information about users' geographic locations.

It should be noted that the media generation application may receive microtrend information from any suitable information source (e.g., a particular website, a particular set-top box, a particular cellular phone, a particular computer, a particular computer network, a particular telephone network, etc.).

The media generation application may receive a response to the one or more queries from the information source that includes the microtrend information at step 330. The received microtrend information is associated with the particular commercial campaign. The media generation application may associate the received microtrend information with the commercial template and multiple media segments and store the microtrend information in a database, such as the above-mentioned object-oriented database.

At step 340, the media generation application may construct one or more commercials based on the received microtrend information. For example, the microtrend information may inform the media generation application that the most e-mailed articles on NYTimes.com generally relate to healthcare. In response, the media generation application for the advertiser creating commercials for the particular politician may retrieve one or more media segments from the database relating to healthcare.

In some embodiments, the media generation application may search through the database for media segments having the metadata tag "healthcare" associated with it. It should be noted that the database may be organized using any suitable approach. For example, media segment data, microtrend information, feedback information, and other data stored in the database along with the commercial campaign may be used in the analysis of microtrend and feedback information. The data in the database may be broken down into components, such as the number of users in the audience and the cost of using the media segment. The user data may be further broken down into user demographic data, demonstrating what types of users make up the audience. Such demographics may include, for example, geographic information, sex, age, or any other suitable demographic or psychographic information.

In another example, the media generation application may receive microtrend information from the Dell.com website that reveals that printer inventory is low. In response, the media generation application for the advertiser creating commercials or other media content for Dell.com may retrieve one or more media segments relating to different deals that do not involve printers.

It should be noted that, to construct one or more commercials, the media generation application may instruct an editing/assembly mechanism to retrieve the corresponding media segments from the database or other storage device and insert the retrieved media segments into the commercial template, thereby generating a completed version of a commercial. The editing/assembly mechanism may include professional editing/assembly software, such as editing software developed by Avid Technology, Inc., Final Cut Pro developed by Apple Computer Inc., intelliSpot or other assembly software developed by Visible World, etc. That is, in response to receiving microtrend information, the media generation application may use one or more of these editing/ assembly mechanisms or transmit the information to another user that has knowledge of these editing/assembly mechanisms to create one or more commercials having the selected media segments.

Using this application, the user may receive a finished version of the commercial. The commercial may be transmitted to a delivery point that transmits and presents the commercial to an audience at step 350.

In some embodiments, the media generation application may also include a feedback mechanism (step 360). The feedback mechanism of the media generation application may receive feedback information from the one or more information sources. The feedback may include, for example, feedback that the information has received from an audience member, information on the responsiveness or effectiveness of a commercial or media content, status updates from the information source (e.g., prevent commercials that are currently broadcast that relate to a particular deal on Dell printers because Dell is running out of printers, prevent commercials for a particular politician relating to a particular topic upon receiving feedback on that topic, etc.). In response to receiving the feedback, the media generation application may associate the feedback with the commercial campaign and store the feedback in the database. The media generation application may also retrieve different media segments for insertion into the commercial template. The different media segments may be used to update one or more commercials (step 340).

For example, the media generation application may receive real-time feedback from the NYTimes.com website that the articles most frequently e-mailed by NYTimes.com readers and the articles most frequently linked to be bloggers on the Web has changed from gun control to abortion. In response, the media generation application that is being used to generate customized commercials for a particular politician may retrieve media segments that are related to abortion. The media generation application may update the previously assembled commercial by inserting the retrieved media segments relating to abortion into the commercial template in place of the previously retrieved media segments relating to gun control. As described previously, to update the commercial, the media generation application may instruct an editing/assembly mechanism to retrieve the corresponding media segments from the database or other storage device and insert the retrieved media segments into the commercial template.

Figure 6:
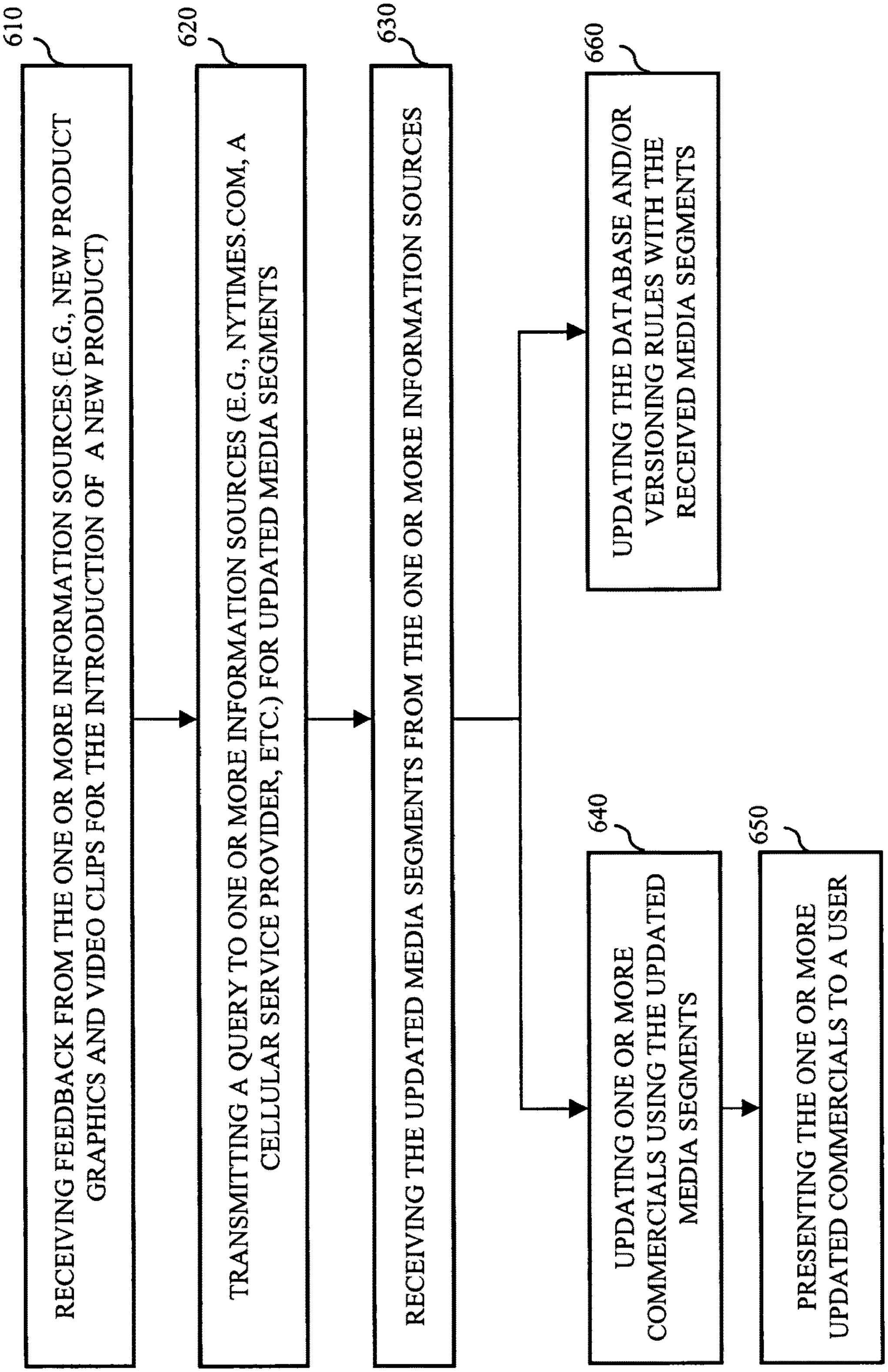
FIG. 6 is a simplified flowchart illustrating the steps performed in updating commercials based on feedback information in accordance with some embodiments of the present invention.

FIG. 6 is a flowchart illustrative the steps performing in updating commercials based on feedback information in accordance with some embodiments of the present invention. This is a generalized flow chart. It will be understood that the steps shown in FIG. 6 may be performed in any suitable order, some steps may be deleted, and others added.

In response to receiving feedback from one or more information sources (e.g., running low on inventory of a particular product, commercials on gun control are not advised, a price change of a particular product, a new incentive or deal, etc.) (step 610), the media generation application may transmit a query to the information sources for updated media segments (e.g., new product graphics, new video segments, updated voiceovers to include a new deal) and/or updated information at step 620. In response to receiving the updated media segments and/or updated information (step 630), the media generation application may update the previously assembled commercial by inserting the retrieved media segments into the commercial template (step 640) and present the updated commercial to the audience (step 650). The media generation application may replace previously retrieved media segments with the newly received media segments. Alternatively, the media generation application may assemble a new version of the commercial using the newly received media segments. As described previously, to update the commercial, the media generation application may instruct an editing/assembly mechanism to retrieve the corresponding media segments from the database or other storage device and insert the retrieved media segments into the commercial template.

In some embodiments, the media generation application may develop or update construction rules based on the received feedback (step 660). For example, in response to receiving information that Ford is running low on a particular car model (e.g., Ford trucks), the media generation application may develop construction rules that push commercials and other media content on other cars (e.g., Ford sedans). The construction rules associated with the commercial template may direct the media generation application to select media segments on cars that are available, such as the Ford sedans, until the media generation application receives feedback information that previously low inventory or out-of-stock cars are available.

Alternatively, in response to receiving information that Ford is running low on a particular car model, the media generation application may develop construction rules that add a media segment to the currently broadcast commercial that informs the viewers when the particular car model is back in stock. In another example, in response to receiving information that Ford is running low on a particular car model, the media generation application may provide the inventory information to the audience through an updated commercial (e.g., "Hurry now, only 5 left on the lot").

In some embodiments, the media generation application may use the received feedback information (e.g., running low on inventory of a particular product, commercials on gun control are not advised, a price change of a particular product, a new incentive or deal, etc.) to provide the user with recommendations and assembly options. The recommendation may include, for example, recommended media segments (e.g., a recommended actor/actress, a recommended voiceover, a recommended background, a recommended music track, recommended video clips, recommended graphics, etc.). The recommendation may also include, for example, multiple selectable options for updating the previously assembled commercial—e.g., after assessing the media segments available in the database, the media segments relating to gun control can be replaced with media segments relating to abortion, education, healthcare, and/or foreign policy. In response to receiving a selection from the user, the media generation application may retrieve the appropriate media segments and update the commercial.

Based on feedback received from the information source, the media generation application may adjust the media segments in the commercial prior to its next broadcast or after broadcast (e.g., pull the commercial and insert a new version of that commercial, play the commercial more frequently).

Figure 7:
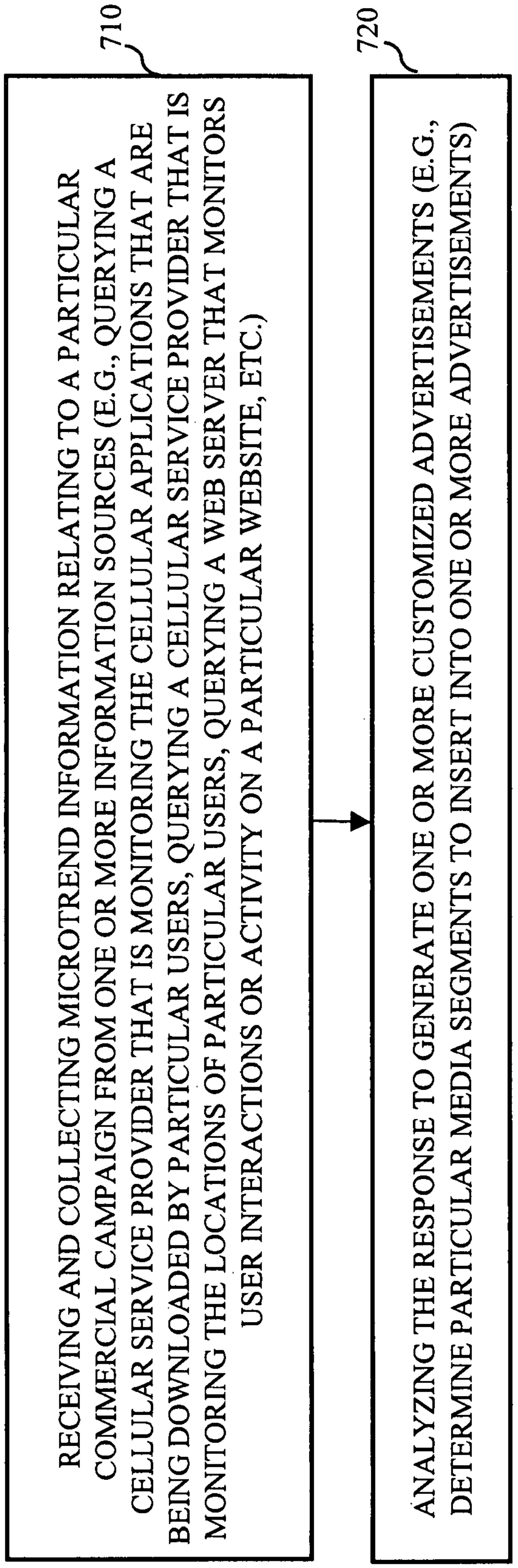
FIG. 7 is a simplified flowchart illustrating the steps performed in analyzing microtrend and/or feedback information in accordance with some embodiments of the present invention.

It should be noted that although the above-mentioned embodiments of the invention are described as receiving microtrend information and/or conclusions on compiled data (e.g., the articles most frequently cited by bloggers on a particular website relates to education issues, the embodiments are not limited only to receiving such microtrend information. Rather, instead of receiving the analysis from the information source (e.g., NYTimes.com determines the most popular movies based on cumulative number of reviews read, movie details pages views, and trailers accessed), the invention may also receive, collect, and analyze microtrend information from multiple information sources. As shown in FIG. 7, the media generation application may collect microtrend information from multiple information sources (step 710) and analyze the collected microtrend information (step 720).

For example, the media generation application may work in conjunction with a particular website (e.g., www.dell-.com), a third-party website (e.g., via an agreement), and/or a linked website (e.g., the New York Times website links to the Dell website). For example, an advertiser using the application may have an established relationship with NYTimes.com (a third-party website) such that the application automatically receives microtrend information from NYTimes.com (e.g., top articles e-mailed to others, top articles viewed by visitors to NYTimes.com, most popular advertisements on NYTimes.com, etc.).

In another example, when the advertiser is generating a commercial for a particular politician, the media generation application may receive microtrend information from both a news website, such as NYTimes.com, and the politician's personal website. The media generation application may collect the microtrend information and, using expert rules or models, analyze the collected microtrend information. For example, the media generation application may perform a keyword search or perform a metadata crawl through the microtrend information to index and/or determine the most prevalent keywords. In another example, each website may include a log of search activity (e.g., keyword searches, site map searches, etc.). The media generation application may retrieve the log of search activity for one or more information sources and analyze the one or more logs to determine microtrend information and which media segments to insert in a particular commercial template.

In another example, when the advertiser is generating a commercial for Ford, the media generation application may review activity on the associated website (e.g., www.ford-.com). The media generation application may compile statistical information based on reviewing the activity on the associated website. For example, in response to determining that 80% of users accessing www.ford.com want to know whether a Ford F-150 truck is available in the color red and can be financed. In response, the media generation application may retrieve media segments and/or media information from the database relating to red Ford F-150 trucks and financing information for the automobile.

In some embodiments, the media generation application may monitor web content or receive information from the particular website regarding the web content. In response, the media generation application may update the commercial based on the monitored web content. Monitoring users and determining that users review particular webpages, review particular subjects or topics, fast-forward through portions of media content (e.g., advertisements), rewind portions of media content, replay media content, pause media content during playback, stop the playback of media content, replay or rewind media content multiple times, watch media content for a particular length of time, link media content, send links to media content to other users, write a blog about particular web content, or perform any other suitable action provides the media generation application with feedback for customizing and updating commercials.

Accordingly, the media generation application allows the user to receive microtrend information and feedback information from one or more information sources and generate or customize commercials based on that receive information.

Although the embodiments described herein use web content to customize commercials, any other suitable source of information may be used. For example, advertisements on cellular telephones may be used to obtain information about a particular demographic. In another example, any suitable environment that is rich media enabled may be used (e.g., a personal digital assistant that has Windows Media Player, a cellular telephone that is capable of receiving streaming media, a video game console that is capable of receiving streaming media, etc.).

As described hereinabove, the media generation application allows the user to receive microtrend information and feedback information from one or more information sources and generate or customize commercials based on that receive information. One of ordinary skill would know how to utilize standard algorithms to implement the processes of the present invention based on the information provided in this application.

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow.

The invention claimed is:

1. A method comprising:

receiving one or more rules associated with a plurality of advertising segments;

receiving, from one or more computing devices, an indication of a popularity of a specific content item associated with the one or more rules; and causing output of one or more advertising segments, of the plurality of advertising segments, at an increased frequency based on the one or more rules and based on the popularity of the specific content item.

2. The method of claim 1, wherein the indication of the popularity of the specific content item indicates one or more of:

a quantity of downloads of the specific content item;

a quantity of times that the specific content item was sent;

a quantity of messages sent indicating the specific content item;

a search history associated with the specific content item; or a quantity of times that a link to access the specific content item was sent.

3. The method of claim 1, wherein the indication of the popularity of the specific content item comprises one or more of:

one or more locations at which the specific content item was downloaded;

one or more sources from which the specific content item was sent for output;

one or more devices that output the specific content item; or one or more times associated with output of the specific content item.

4. The method of claim 1, wherein the indication or popularity is based on information indicating one or more of:

a time point at which the specific content item was paused;

a time point at which output of the specific content item was stopped;

a length of time for which the specific content item was output;

a portion of the specific content item that was replayed;

a portion of the specific content item that was fast-forwarded;

a portion of the specific content item that was rewound; or a portion of the specific content item that was skipped during output of the specific content item.

5. The method of claim 1, wherein the one or more computing devices comprises one or more of:

a website, a cellular provider, or a set-top box.

6. The method of claim 1, wherein the one or more rules comprise a plurality of rules for selecting, based on quantities of outputs of a plurality of content items comprising the specific content item, the plurality of advertising segments.

7. The method of claim 1, wherein the one or more rules:

indicate one or more topics associated with the one or more advertising segments; and comprise a rule to output the one or more advertising segments at a frequency based on a popularity of content related to the one or more topics.

8. The method of claim 1, wherein the one or more rules are associated with an advertising campaign.

9. The method of claim 1, further comprising requesting, from the one or more computing devices based on the one or more rules, the indication of the popularity of the specific content item.

10. The method of claim 1, further comprising monitoring, based on the one or more rules, the one or more computing devices for output of the specific content item.

11. An apparatus comprising:

one or more processors; and memory storing instructions that, when executed by the one or more processors, cause the device to:

receive one or more rules associated with a plurality of advertising segments;

receive, from one or more computing devices, an indication of a popularity of a specific content item associated with the one or more rules; and cause output of one or more advertising segments, of the plurality of advertising segments, at an increased frequency based on the one or more rules and based on the popularity of the specific content item.

12. The apparatus of claim 11, wherein the indication of the popularity of the specific content item indicates one or more of:

a quantity of downloads of the specific content item;

a quantity of times that the specific content item was sent;

a quantity of messages sent indicating the specific content item;

a search history associated with the specific content item; or a quantity of times that a link to access the specific content item was sent.

13. The apparatus of claim 11, wherein the indication of the popularity of the specific content item comprises one or more of:

one or more locations at which the specific content item was downloaded;

one or more sources from which the specific content item was sent for output;

one or more devices that output the specific content item; or one or more times associated with output of the specific content item.

14. The apparatus of claim 11, wherein the indication or popularity is based on information indicating one or more of:

a time point at which the specific content item was paused;

a time point at which output of the specific content item was stopped;

a length of time for which the specific content item was output;

a portion of the specific content item that was replayed;

a portion of the specific content item that was fast-forwarded;

a portion of the specific content item that was rewound; or a portion of the specific content item that was skipped during output of the specific content item.

15. The apparatus of claim 11, wherein the one or more computing devices comprises one or more of:

a website, a cellular provider, or a set-top box.

16. A non-transitory computer-readable medium storing instructions that, when executed, cause:

receiving one or more rules associated with a plurality of advertising segments;

receiving, from one or more computing devices, an indication of a popularity of a specific content item associated with the one or more rules; and causing output of one or more advertising segments, of the plurality of advertising segments, at an increased frequency based on the one or more rules and based on the popularity of the specific content item.

17. The non-transitory computer-readable medium of claim 16, wherein the indication of the popularity of the specific content item indicates one or more of:

a quantity of downloads of the specific content item;

a quantity of times that the specific content item was sent;

a quantity of messages sent indicating the specific content item;

a search history associated with the specific content item; or a quantity of times that a link to access the specific content item was sent.

18. The non-transitory computer-readable medium of claim 16, wherein the indication of the popularity of the specific content item comprises one or more of:

one or more locations at which the specific content item was downloaded;

one or more sources from which the specific content item was sent for output;

one or more devices that output the specific content item; or one or more times associated with output of the specific content item.

19. The non-transitory computer-readable medium of claim 16, wherein the indication or popularity is based on information indicating one or more of:

a time point at which the specific content item was paused;

a time point at which output of the specific content item was stopped;

a length of time for which the specific content item was output;

a portion of the specific content item that was replayed;

a portion of the specific content item that was fast-forwarded;

a portion of the specific content item that was rewound; or a portion of the specific content item that was skipped during output of the specific content item.

20. The non-transitory computer-readable medium of claim 16, wherein the one or more computing devices comprises one or more of:

a website, a cellular provider, or a set-top box.

* * * * *